(12) United States Patent
Niebling et al.

(10) Patent No.: US 7,604,416 B2
(45) Date of Patent: Oct. 20, 2009

(54) OUTER RING OF A WHEEL BEARING, AND AXIAL SECURING ELEMENT FOR SAID OUTER RING

(75) Inventors: Peter Niebling, Bad Kissingen (DE); Jens Heim, Bergrheinfeld (DE); Heinrich Hofmann, Schweinfurt (DE); Roland Langer, Schwanfeld (DE); Darius Dlugai, Schweinfurt (DE); Horst Doeppling, Herzogenaurach (DE); Wolfgang Steinberger, Herzogenaurach (DE)

(73) Assignee: Schaeffler KG, Schweinfurt (DE)

( * ) Notice: Subject to any disclaimer, the term of this patent is extended or adjusted under 35 U.S.C. 154(b) by 331 days.

(21) Appl. No.: 10/596,498

(22) PCT Filed: Dec. 6, 2004

(86) PCT No.: PCT/DE2004/002676
§ 371 (c)(1),
(2), (4) Date: Jun. 15, 2006

(87) PCT Pub. No.: WO2005/059389
PCT Pub. Date: Jun. 30, 2005

(65) Prior Publication Data
US 2007/0086690 A1    Apr. 19, 2007

(30) Foreign Application Priority Data
Dec. 18, 2003    (DE) .................. 103 59 644

(51) Int. Cl.
*F16C 13/00* (2006.01)
(52) U.S. Cl. ....................................................... 384/544
(58) Field of Classification Search ................ 384/544, 384/589; 301/105.1
See application file for complete search history.

(56) References Cited

U.S. PATENT DOCUMENTS

| | | | | |
|---|---|---|---|---|
| 2,037,982 | A * | 4/1936 | Hughes | 384/506 |
| 3,757,883 | A * | 9/1973 | Asberg | 180/370 |
| 5,137,123 | A * | 8/1992 | Setogawa et al. | 188/264 AA |
| 5,486,053 | A * | 1/1996 | Beagley et al. | 384/513 |
| 6,626,580 | B2 * | 9/2003 | Tajima et al. | 384/544 |
| 2005/0018939 | A1 * | 1/2005 | Niwa et al. | 384/544 |

FOREIGN PATENT DOCUMENTS

| | | | |
|---|---|---|---|
| JP | 7-317777 | * | 12/1995 |
| JP | 2003-25803 | * | 1/2003 |

* cited by examiner

*Primary Examiner*—Thomas R Hannon
(74) *Attorney, Agent, or Firm*—Lucas & Mercanti, LLP (57) ABSTRACT

The invention relates to an outer ring of a wheel bearing and the axial securing element thereof, which comprises a radial flange. Said radial flange extends radially outward from the axial end of the tubularly embodied outer ring. The flange is provided with recesses which penetrate the flange in an axial direction, are radially open towards the outside, and are used for fastening the flange to a wheel support.

10 Claims, 9 Drawing Sheets

OUTER RING OF A WHEEL BEARING, AND AXIAL SECURING ELEMENT FOR SAID OUTER RING

FIELD OF THE INVENTION

The invention relates to an outer ring of a wheel bearing having a radial flange, the flange extending radially outward at the axial end of the outer ring of tubular configuration, and to an axial securing means of the outer ring on a wheel carrier.

BACKGROUND OF THE INVENTION

DE 39 40 395 A1 describes customary arrangements of wheel bearings. Wheel bearings are either accommodated completely in a wheel carrier or the like, or are suspended on a flange. Tests have shown that the wheel modules with wheel bearings which are as a rule suspended on the wheel carrier via a flange on the outer ring make up a higher weight proportion of the unsprung masses than wheel bearings which are arranged in a hole of a wheel carrier. The construction of the wheel bearings, which are suspended on the wheel carrier and are therefore at least partially self-supporting, and their suspension is to be of particularly rigid design, which results in the increased weight proportion in comparison with the wheel bearings which are accommodated in holes.

DE 39 40 395 A1 thus describes a wheel bearing having an outer ring, rolling bodies and two inner rings, in which the outer ring has a radial flange axially between the end sides and away from the end sides, with which radial flange the wheel bearing is suspended. The wheel bearing is fixed axially and radially on the wheel carrier via the flange A hollow cylindrical section of the outer ring which adjoins the flange axially is seated in a hole of the carrier, with the result that the outer ring bears against the carrier axially by means of the flange and at least partially radially at least with the section. The weight proportion of the solidly configured flange on the outer ring is relatively high. This has a disadvantageous effect on the overall weight of the unsprung masses of a wheel module on the vehicle.

Furthermore, DE 39 40 395 A1 describes a wheel bearing which is accommodated completely in a hole of a wheel carrier. The outer ring is of solid configuration and manufactured by material removing machining. A press fit which is customary in the roller bearing field secures the outer ring in the hole. In the case of loading of the wheel bearing during driving operation, the outer ring tends to move axially despite the press fit. To counteract this, the outer ring is secured in the hole with a securing ring axially on one side and is supported on an inner shoulder on the other side. The preparation of a bearing seat of this type is complicated, as the shoulder makes material removing machining difficult in the axial direction. Furthermore, the notch is to be introduced for the securing ring. The press fit also often becomes loose during driving operation, with the result that notches are produced on the carrier or on the outer ring by wear, and/or the known and undesirable creaking noises occur, as a result of the micromovements of the outer ring with respect to the carrier. The weight of the solid outer ring has a disadvantageous effect on the total balance of the unsprung masses on the vehicle.

SUMMARY OF THE INVENTION

It is therefore the object of the invention to provide an outer ring for a wheel bearing unit, with the installation of which into the wheel bearing unit the above-mentioned disadvantages are avoided.

This object is achieved in accordance with the subject matter of claim 1.

Instead of through holes, the flange has recesses which pass axially through the flange and are open radially to the outside, for fastening the flange to a wheel carrier. The weight proportion of the overall weight of the flange is therefore reduced considerably, as the material of an annular section of the flange which usually encloses the recesses on the outside is omitted.

One embodiment of the invention provides for the recesses to be of arcuate design. As an alternative, however, recesses are also provided which extend radially from the outside in the manner of a slot in the direction of the rotational axis of the wheel bearing.

During the manufacture of a flange of this type, the flange which is initially provided with through holes is, for example, machined from the outside to remove material by machining until the superfluous proportion of the material which delimits the holes radially on the outside is removed from the flange. As an alternative to this, the contour according to the invention of the flange is produced by punching. This is particularly advantageous when the outer ring is cold formed. Machining to remove material from the edge is therefore superfluous. In this case, the recesses and the other sections of the flange which are accessible radially from the outside have a punched edge from a punching process for cutting at least the recesses.

The flange is formed, axially between the end sides of the flange and at the same time axially spaced apart from the end sides, on the outer ring or fastended to the outer ring. In so doing, the wheel bearing is suspended by means of the flange on the wheel carrier or the like or is supported radially at least partially in the wheel carrier.

As an alternative, one embodiment of the invention provides for the section of the outer ring, on which raceways for the rows are formed at least partially, to be supported radially in the wheel carrier. As a result, the entire wheel bearing is as a rule surrounded by the wheel carrier. The flange is formed at the axial end of the outer ring and protrudes radially outward at one end of the hole. The flange either bears directly axially against the wheel carrier or is supported axially on the wheel carrier via spacer means. The wheel bearing is secured axially with respect to the carrier in the hole via the flange, as the flange is fastened to the wheel carrier with suitable means. Axial movement of the outer ring during driving operation is avoided. Moreover, the channel at the transition from the flange to the outer ring is relieved, as the outer ring is supported radially in the wheel carrier under load.

In this context, wheel carriers are to be understood as all connecting constructions for wheel bearing modules and wheel bearing units of driven and nondriven wheels, to/in which the wheel bearing modules or wheel bearing units are fastened. The wheel carriers which are cast or forged or manufactured in another suitable way are manufactured from all conceivable materials, that is to say from steel and/or from aluminum alloys at least around the hole for accommodating the wheel bearing. A wheel bearing according to the invention which is fixed axially on the wheel carrier by means of the flange of the outer ring is fixed axially also when the radial seat of the wheel bearing has become loose radially, for example, in a carrier made from an aluminum alloy on account of influence factors mentioned at the beginning.

In this context, wheel bearings are to be understood as all one row, two row and multiple row wheel bearings having rollers and/or balls as rolling bodies, having one or more inner rings of one part or multiple parts, which are configured in a very wide range of arrangements, such as in a radial ball bearing arrangement or angular contact ball bearing arrangement or as in a radial roller bearing arrangement or angular contact roller bearing arrangement. As an alternative, one or all of the inner raceways is/are not formed on one/a plurality of inner rings but is/are formed directly on a hub which is arranged in the wheel bearing.

Before the installation of the wheel bearing in the wheel carrier, the hub of a wheel bearing module for a driven or nondriven wheel is fixed in the wheel bearing, for example by a flange rim on the bearing. Here, the flange rim reaches behind the bearing arrangement in such a way that the hub is fixed on the wheel bearing such that it cannot be separated from the wheel bearing. As an alternative, the hub or a bolt, with which the wheel is mounted in the wheel bearing such that it can rotate with respect to the wheel carrier, is inserted only when the wheel bearing is fixed to the carrier.

The wheel bearing for mounting driven and/or nondriven wheels on vehicles is installed with the outer ring in the wheel carrier in such a way that the flange of the outer ring points toward the vehicle or away from the vehicle. On wheel bearings, with which driven wheels are mounted, alternatively the flange of the outer ring either bears against that side of the wheel carrier which faces the wheel flange, or the flange bears against a side of the wheel carrier which faces away from the wheel flange.

One embodiment of the invention provides for the outer ring to be relatively thin-walled and therefore elastic in comparison with the rigid housing which surrounds the hole. The wall of the outer ring has thin cross sections. The outer ring, in particular a ring which is manufactured by cold forming, is partially hardened or is hardened overall; or an outer ring which is manufactured as desired without material removing processing after the hardening, is therefore unstable in itself or unround as an individual part on the outside and, in particular, on the inside at the raceways, in such a way that the optimum geometry which is necessary for rolling contact is not realized initially. This particularly relates to the diameter and the roundness of the section which is considered transversely with respect to the rotational axis, with which section the outer ring is pressed into the hole, before mounting in the wheel carrier. In this case, optimum geometry is to be understood as the roundness of the raceways in rolling contact, which ensures optimum rolling conditions in the bearing. Shape accuracies of this type are usually produced by turning and grinding on solid bearing rings which are machined with removal of material and the housing holes for accommodating the bearing rings. The manufacture of geometry of this type is time consuming and expensive. However, the invention provides for the finished contour of the outer ring to have, at least at the section, the above-mentioned deviations from the optimum geometry. The hole of the carrier corresponds to the optimum requirements on account of its geometry which is produced by removing material.

The deviations of the outer contour of the outer ring from the optimum geometry are compensated for by the elastic, partially plastic, behavior of the outer ring when the outer ring is pressed into the hole. To this end, the outer ring has, initially at least at the section, an external diameter which is greater than the internal diameter of the hole. The excess dimension is also required for the press fit, with which the outer ring is seated in the carrier. The outer ring is constricted radially inward by being pressed into the hole, and is adapted to the roundness of the hole. The shape accuracies of the hole and also the excess dimension are transmitted almost completely to the geometry of the raceways, as the housing of the carrier is rigid in comparison with the outer ring. The hole in the wheel carrier which is comparatively rigid with respect to the outer ring has substantially its initial geometry before the wheel bearing is pressed in, when the wheel bearing is seated in the hole. The functionally required roundnesses on the raceway are therefore only produced on the outer ring after the outer ring is pressed into the hole. Moreover, the elastic change in shape is also advantageous, inter alia, for the necessary freedom from play of the wheel bearing when the wheel bearing is mounted completely as a unit.

The thin walled outer ring is preferably configured in one piece with the flange, but the flange can also be fastened to the outer ring by welding or by a force transmitting and/or form fitting seat. One embodiment of the invention provides for the outer ring to be made from formed material. Accordingly, the shape of the outer ring with all its shaped elements is produced by forming. Cutting or material removing machining is restricted only to a very small amount of the machining in comparison with the amount of chipless machining. Only excess material, edges, burrs and the like are therefore removed from the shaped part by cutting or punching. Only the raceways are optionally machined in a material removing manner by precision machining such as grinding, lapping or polishing. Cold forming is to be understood as all the forming processes, in which the contour of the hollow outer ring can be manufactured by stretching or upset forging, expansion or contraction, and the shape of the starting material can be changed plastically in the process without material being cut. Processes of this type are, for example, drawing, deep drawing, rolling, pressing and combinations of the above-mentioned processes.

Tubes and metal sheets for example, are provided as blanks for the manufacture of the outer rings. A blank comprising a tube is machined to form the finished outer ring by expansion, rolling, contracting, upset forging and the folding over of edges. Outer rings which are manufactured from a metal sheet are manufactured by drawing and further individual processes mentioned above or combinations of the latter. In this case, one embodiment of the invention provides for the flange to be exactly as wide, axially from the end side of the outer ring as far as the wheel carrier against which the flange bears, as the starting material of the metal sheet was thick before the outer ring was manufactured. Preferred materials are cold formable bearing materials, such as 100Cr6 or else all suitable deep drawing steels.

The outer ring is distinguished by a low weight, as starting material having a small wall thickness or small sheet thickness has been used. The thickness of the starting material preferably lies in the range from 2.4 to 5 mm. The overall proportion of the wheel bearing unit in the weight of the unsprung masses is reduced by way of the thin walled outer ring which is manufactured by removing material or without cutting.

The flange is preferably fastened to the wheel carrier with bolts which, for example, are screwed or pressed into the wheel carrier. Other fastening elements are conceivable, such as clamps or the like which engage behind the flange at least one fastening edge on a side of the flange which faces away axially from the wheel carrier. As an alternative to this, bolts are provided which are fastened to the wheel carrier by welding or screwing and onto which in each case a nut is screwed and prestressed axially against the flange. The bolts reach through axial recesses on the flange. Here, the head of each of the bolts bears axially at the same time against the wheel carrier and against the flange. The uniform contact of the heads is secured by axial faces on the wheel carrier and on the flange of the outer ring which lie in a common plane. To this end, the wheel carrier has projections which protrude axially from the end-side contact face, on which the flange bears axially against the wheel carrier. The projections protrude axially to such an extent that the axial face which is formed on the end of the projections lies axially in one plane with the axial face on the flange which faces away from the carrier.

As an alternative to the axial projections, the wheel carrier is provided with an annular section which is circumferential or interrupted in the circumferential direction. The annular section surrounds the flange radially on the outside. The heads of the fastening means bear jointly against this axial annular section.

As viewed in a longitudinal section through the outer ring along the rotational axis of the outer ring, the concave contour of the channel between the flange and the outer ring merges at a first transition, for example, into a circularly annular face of the flange and at the second transition, for example, into a cylindrical circumferential face of the section. As an alternative, the first and the second transitions end, for example, in each case in an annular groove, which is shaped in the manner of an undercut, in the flange or in the section. Here, it is particularly significant that a perpendicular spacing between an imaginary axial extension of the circumferential surface of the flange and the first transition is smaller than a spacing which is parallel to the rotational axis between an imaginary radial extension of the circumferential surface and the second transition.

Here, the channel is advantageously described by at least two radii which follow one another between the transitions, whereas at least a first radius merging radially into the flange at the transition and at least a second radius merging axially into the first section at the transition. In longitudinal section in the direction of the transitions, the radii are either separated from one another by a straight line, or, preferably, merge into one another between the flange and the section.

The outer ring is supported in the wheel carrier at least in sections at least radially with respect to the rotational axis in such a way, that the flange which is formed axially on the end side of the outer ring bears axially against the wheel carrier and radially against the outer ring, without the carrier being in contact with the channel. Additional stresses in the channel as a result of the influence of sharp edges of the carrier are also avoided by a chamfer of sufficient dimensions on the hole.

DETAILED DESCRIPTION OF THE INVENTION

Figure 1:
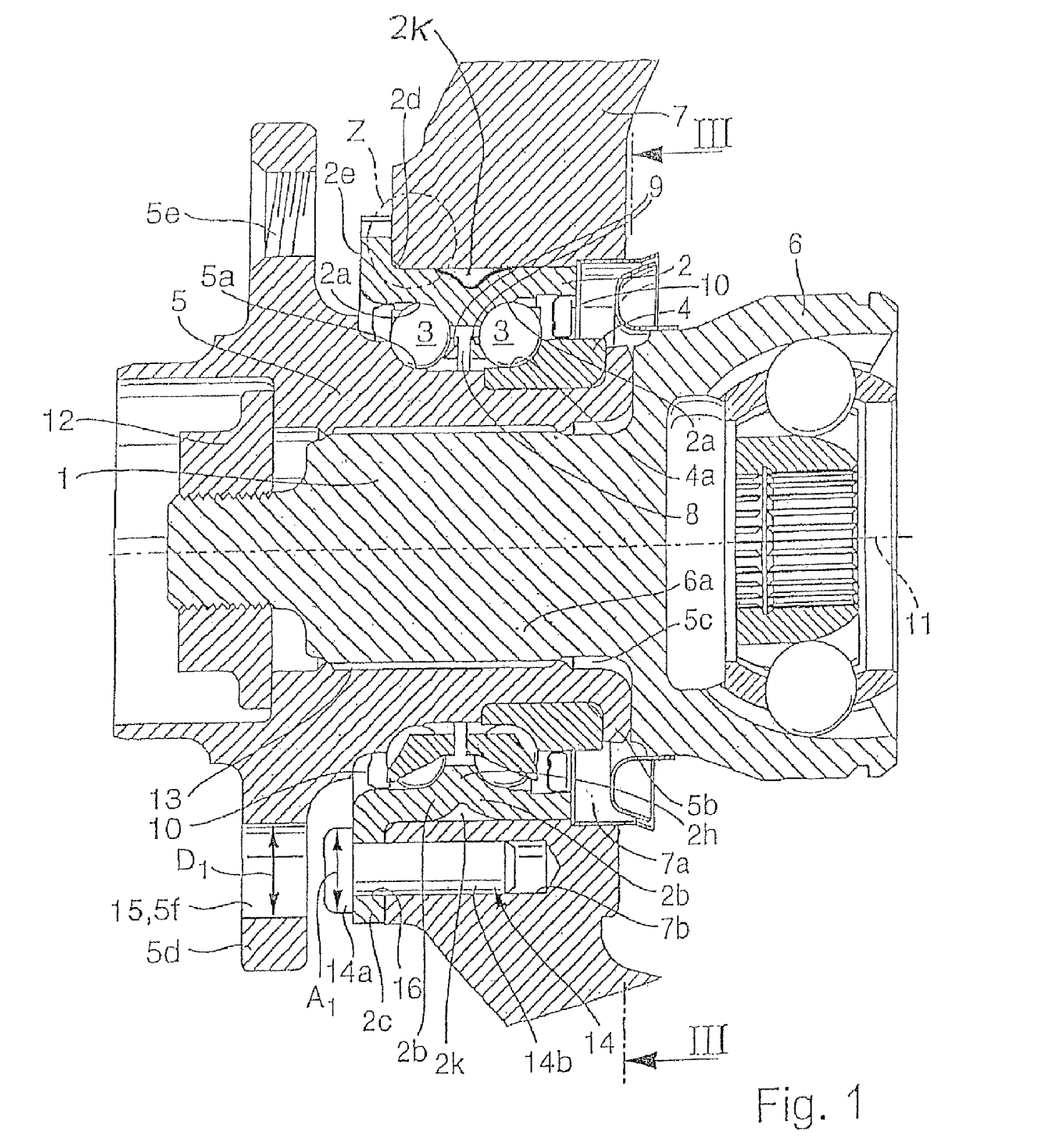
FIG. 1 is a longitudinal sectional view of a wheel bearing module constructed according to the principles of the invention.

FIG. 1 shows a wheel bearing module 1 in a longitudinal section along a rotational axis 11. The wheel bearing module is provided with an outer ring 2, with two rows of rolling bodies 3, with an inner ring 4, with a hub 5 and with an articulation bell 6. The structural unit of the wheel bearing module which is preassembled from the individual parts 2, 3, 4, 5, 6 is seated in a wheel carrier 7.

The wheel bearing 8 comprising the outer ring 2, the rolling bodies 3, in this example in the form of balls, cages 9, seals 10, the inner ring 4 and the hub 5 is preassembled so as to hold together. To this end, the rolling bodies 3 and the inner ring 4 are held in the outer ring 2 by means of the hub 5. Here, one row of the rolling bodies 3 is supported on a raceway 2a of the outer ring 2 and on a raceway 5a which is formed directly on the hub 5. The other row of the rolling bodies 3 is arranged between a further raceway 2a and a raceway 4a of the inner ring 4. The wheel bearing 8 is prestressed without play by means of a flange rim 5b on the hub 5 via the inner ring 4 and the outer ring 2, at least when the wheel bearing 8 is mounted in the wheel carrier 7. The hub 5 is fixed nonreleasably to the wheel carrier 8 via the flange rim 5b.

The hub 5 is configured to be substantially rotationally symmetrical about the rotational axis 11 and has an axial through hole 5c. A stub 6a on the articulation bell 6 reaches through the through hole 5c axially. The articulation bell 6 is secured axially on the hub 5 via a nut 12. A wheel flange 5d which points radially to the outside is formed on the hub 5. A connection which is fixed rotationally about the rotational axis 11 is produced between the articulation bell 6 and the wheel flange 5d via tooth profiles 13 on the stub 6a and on the hub 5.

Axial holes 5e are formed on the wheel flange 5d, into which axial holes 5e wheel bolts (not shown) engage for fastening a vehicle wheel. Furthermore, the wheel flange 5d has axial recesses 5f which lie axially opposite a flange 2c at least once per revolution of the wheel flange 5d about the rotational axis 11, in such a way that the wheel flange 5d does not cover the fastening element 14 axially on account of the recesses 5f. The diameter $D_1$ of the recess 5f which is configured as an axial through hole 15 is greater than the greatest radial dimension $A_1$ of the head 14a.

The outer ring 2 is formed from two hollow cylindrical sections 2b and from the radial flange 2c. The wheel bearing 8 is supported radially in a hole 7a of the wheel carrier 7 via the sections 2b. At one of the sections 2b, the outer ring 2 merges radially into the flange 2c via a channel 2d. The flange 2c bears axially on the outside against the wheel carrier 7 and is engaged from behind by the fastening elements 14 in the form of bolts on the side 2e which faces axially away from the wheel carrier 7. The fastening element 14 is prestressed axially fixedly against the flange 2c with the head 14a, as a shaft 14b which is fixed on the bolt is fixed axially in a fastening hole 7b of the wheel carrier 7. The fastening elements 14 are optionally pressed or screwed into the fastening holes 7b.

Figure 2:
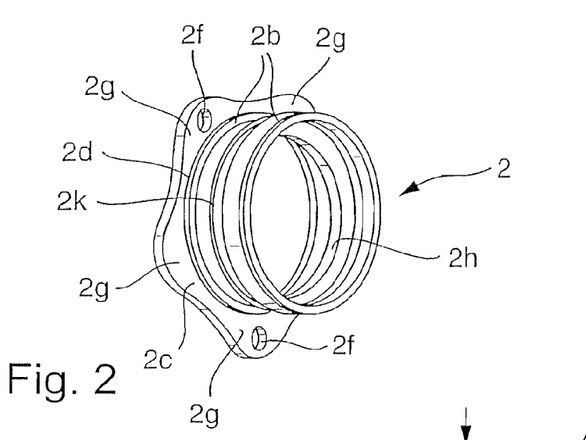
FIG. 2 is a perspective view of an outer ring.

FIG. 2 shows a complete view of the outer ring 2. The outer ring 2 is a component which is manufactured by cold forming, the flange 2c of which has radially protruding sections 2g. The recesses 2f are made in three of the sections 2g as axial through holes 16.

Figure 2A:
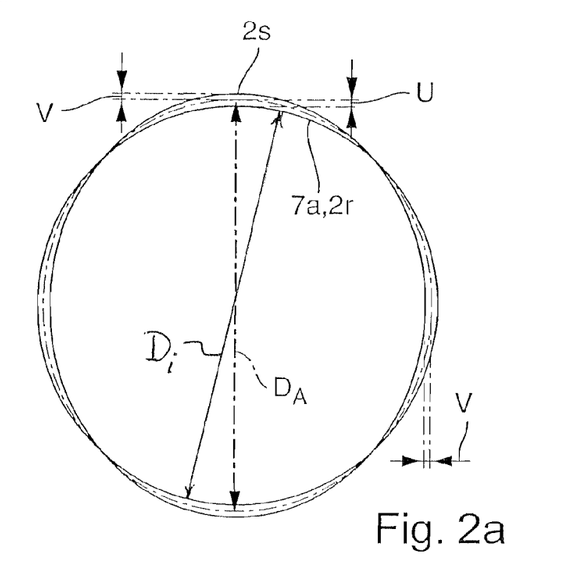
FIG. 2a shows the shape deviations of the outer ring.

FIG. 2a shows the shape deviations of the outer ring 2 as an individual component in comparison with the internal geometry 2r of the hole 7a. On account of its thin wall after cold forming, the outer ring 2 has an external geometry 2r, the diameter $D_A$ of which is initially greater by the excess dimension 2×U than the internal diameter $D_1$ of the hole 7a. In addition, the external geometry 2s deviates by the amount 2×V from the internal geometry 2r of the fastening hole 7b. After mounting of the outer ring 2 in the fastening hole 7b, the outer ring 2 is constricted to such an extent that the external geometry 2s corresponds substantially to the diameter $D_1$ and the internal geometry 2r.

The outer ring 2 has a radial shoulder 2h. The radial shoulder 2h is arranged between the raceways 2a, the raceways 2a being formed at least partially on the radial shoulder 2h. An annular groove 2k is made in the outer ring 2 radially from the outside. On the one hand, the annular groove 2k is resulting from the displacement of material out of the outer ring 2 for forming the radial shoulder 2h, and on the other hand, a certain elasticity is imparted to the outer ring 2 in the region of the raceways 2a.

Figure 2B:
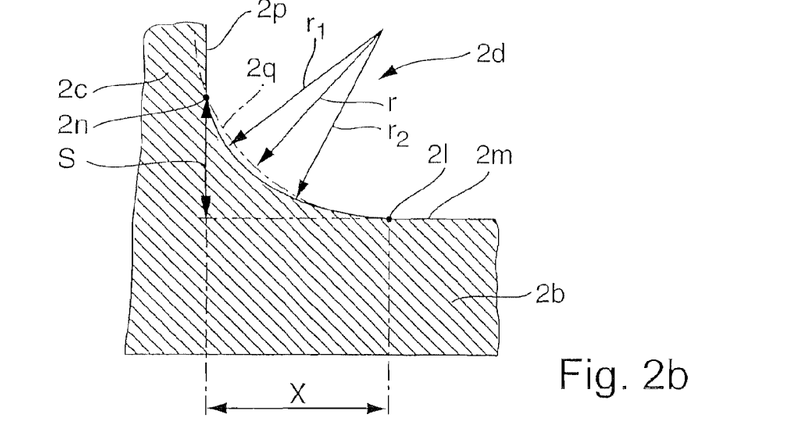
FIG. 2b provides an enlarged illustration of the detail Z from FIG. 1.

FIG. 2b, an enlarged illustration of the detail Z from FIG. 1, shows the channel 2d in an extremely enlarged illustration which is not to scale. The channel 2d is of concave configuration and merges into a circular cylindrical circumferential surface 2m of the section 2b at a first transition 2l. The channel 2d merges at the transition 2n into a circularly annular face 2p at the flange 2c. The perpendicular spacing S between the imaginary axial extension of the circumferential surface 2m and the transition 2n is smaller than a spacing X which is parallel to the rotational axis 11 between an imaginary radial extension of the circularly annular face 2p and the transition 2l.

FIG. 2b also shows that the contour of the channel 2d deviates from a contour 2q which is shown with dash dotted lines and is described by a radius r in a longitudinal section through the outer ring 2. The channel 2d is described in the longitudinal section of the radii $r_1$ and $r_2$. The radius $r_1$ merges into the flange 2 at the transition 2n and the radius $r_2$ merges axially into the section 2b at the transition 2l. The radii $r_1$ and $r_2$ merge into one another between the flange 2c and the section 2b.

The wheel carrier 7 bears axially against the flange 2c and radially against the section 2b in such a way that the wheel carrier 7 and the channel 2d are spaced apart from one another at least as far as the transitions 2l and 2n. The maximum stresses radially below the recesses 2f are approximately a third higher at the contour 2q which is described by the radius r than the stresses in a channel 2c which is described by the radii $r_1$ and $r_2$.

The wheel flange 5d lies axially opposite the flange 2c and protrudes radially to a greater extent than the flange 2c (FIG. 1), with the result that the flange 2c is initially covered by the wheel flange 5d initially axially in the direction of the wheel carrier 7.

Figure 3:
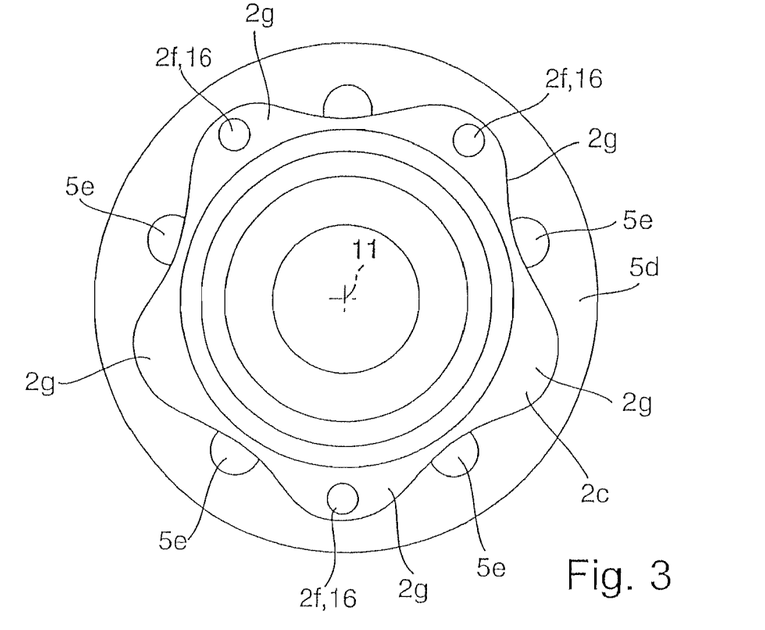
FIG. 3 is a front view of the wheel bearing module without its articulation bell or wheel carrier, taken along line III-III of FIG. 1.
Figure 4:
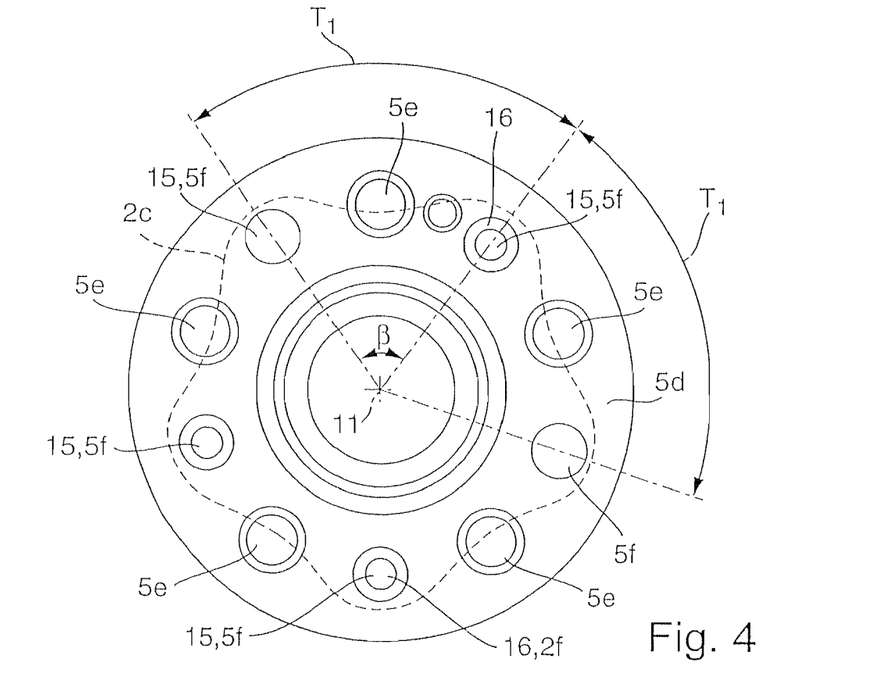
FIG. 4 shows the wheel bearing module from the view opposite that of FIG. 3.

FIG. 3 and FIG. 4 show the wheel bearing module 1 in different front views. FIG. 3 shows the wheel bearing module 1, without articulation bell and without wheel carrier, along the line III-III in the direction according to FIG. 1 which is marked with the arrows. FIG. 4 shows the wheel bearing module 1 in a view which is opposite to that of FIG. 3, with a view of the wheel flange 5d in the direction of the wheel carrier 7. It can be seen, in particular, from FIG. 4 that the wheel flange 5d covers the flange 2c on the outer ring 2 completely axially in the direction of the wheel carrier, but in each case one of the recesses 5f, at the same time as the other recesses 5f, lies axially opposite on the wheel flange 5d once per revolution of the wheel flange 5d about the rotational axis 11, in such a way that the wheel flange 5d does not cover the flange 2c axially at the recesses 2f and at the edges of the recesses 2f.

The term "the edges of the recess" is to be understood as the region which adjoins the recesses and on which the fastening elements bear against the flange. For this reason, the recesses 5f are designed to be at least large enough that it is possible for the fastening means 14 with head and also a tool which surrounds the fastening means 14 at the head 14a to be guided axially through the recesses 5f.

The recesses 5f are distributed around the rotational axis 11 with the same pitch $T_1$ with respect to one another, the pitch $T_1$ being predefined by the angle β, in this case β=72°.

The holes 5e in the wheel flange 5d are provided in each case with an internal thread 5g (FIG. 1), into which the wheel bolts are screwed. It is conceivable to use holes 5e without an internal thread at the same time for axial access to the holes 16. This is possible, as an outer envelope circle which surrounds all holes 15 on the outside is greater than an outer envelope circle which surrounds all holes 16 on the outside, and an envelope circle which bears against all holes 15 on the inside is smaller than an inner envelope circle which bears against all holes 16.

The number of recesses 5f on the wheel flange 5 (in this case, five) is greater than the number of recesses (in this case, three) 2f on the flange 2c. However, the number of recesses can also coincide.

As can be seen from FIG. 4, each of the surplus recesses 5f in one of the sections 2g without holes 16 lies axially opposite at the same time as the other recesses 5f. These two sections 2g, which are without the recess 2f, as can be seen from FIG. 3 in particular, are provided for the contact of axial supports for the flange 2 when being pressed into the hole 7a of the wheel carrier. Here, the axial supports reach axially through two of the recesses 5f.

Figures 5, 6, 7:
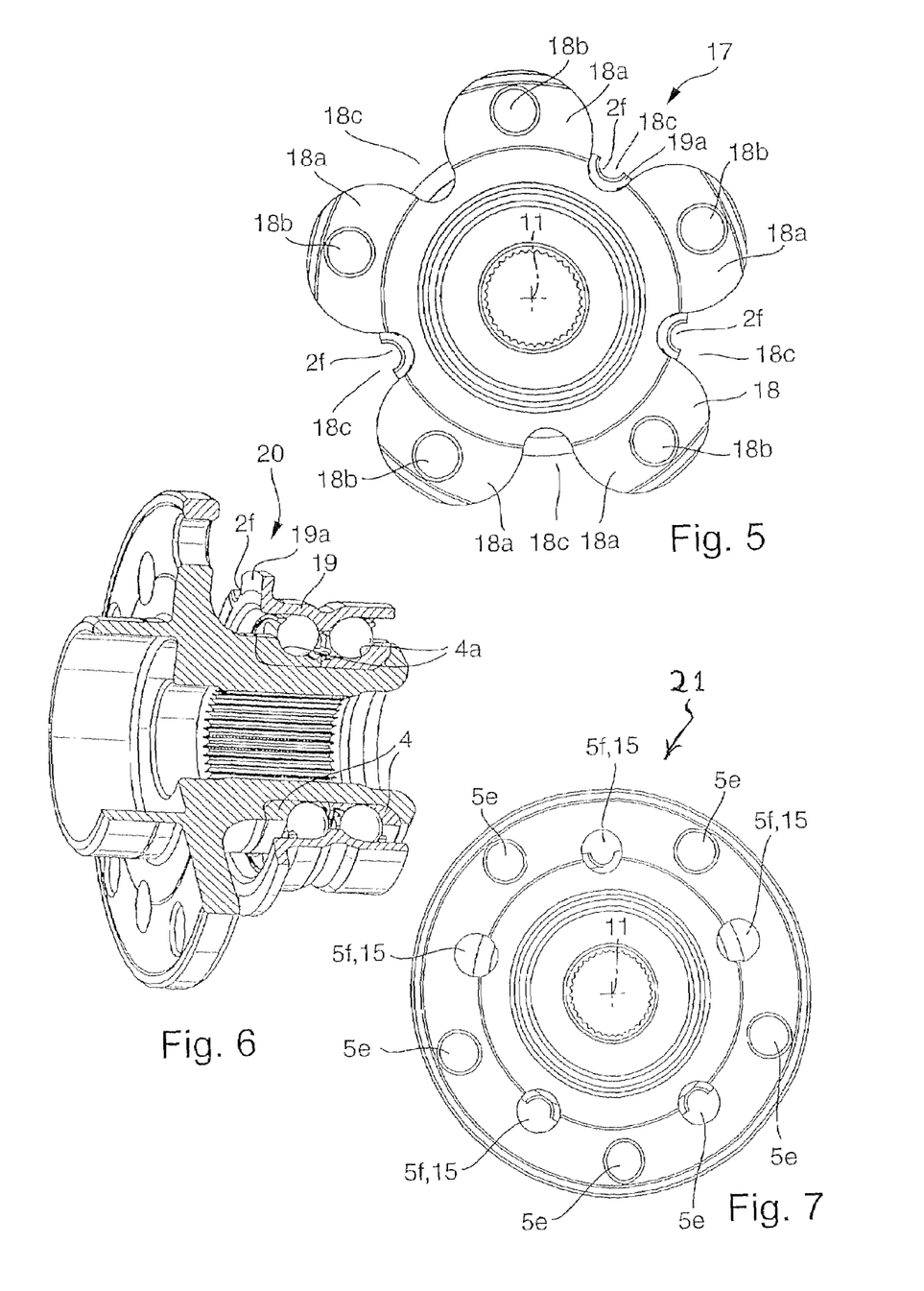
FIG. 5 is a front view of a wheel bearing with a wheel flange.
FIG. 6 is a sectional view of a wheel bearing for a non-driven vehicle wheel.
FIG. 7 is a front view of a different embodiment of a wheel flange.

FIG. 5 shows a wheel bearing 17 with a wheel flange 18. Radially protruding sections 18a of the flange have axial holes 18b, into which wheel bolts (not shown) engage for fastening a vehicle wheel. Between every two circumferentially adjacent sections 18a, a recess according to the invention 18c, open to the outside is formed on the wheel flange. Instead of axial through holes, the flange 19a has arcuate recesses 2f which are open radially to the outside. The wheel flange 18 is rotated into position about the rotational axis 11 with respect to the flange 19a in such a way, that the recesses 2f are not covered by the wheel flange 18 in the axial direction.

Figure 8:
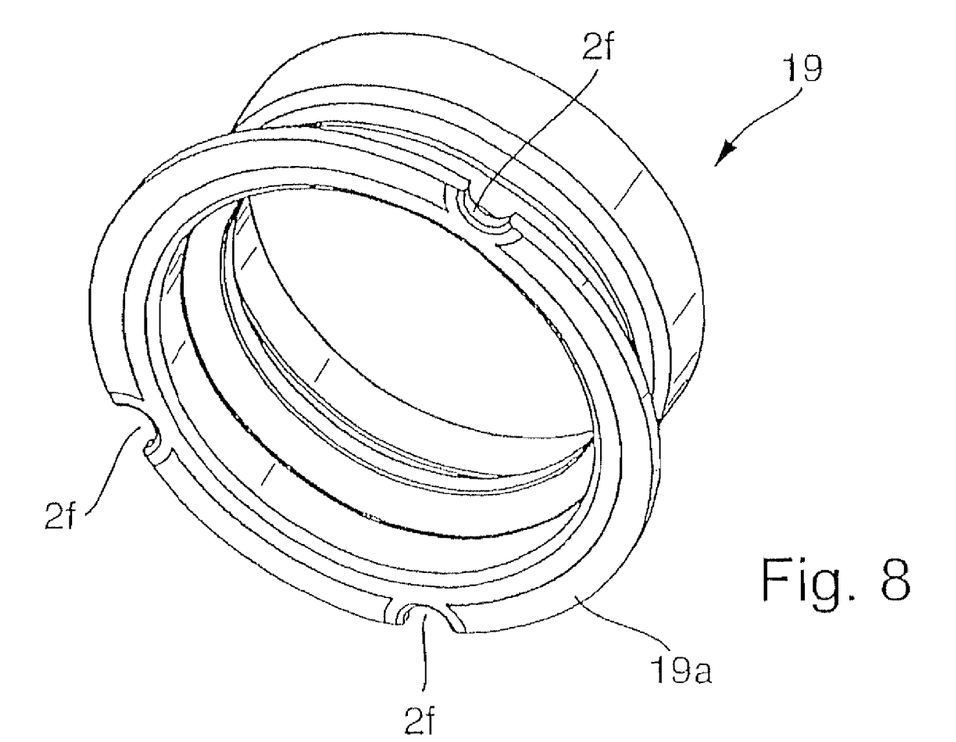
FIG. 8 is a perspective view of another embodiment of the outer ring.

FIG. 6 shows a wheel bearing 20 for a nondriven vehicle wheel, in which optionally different wheel flanges can be mounted, with an outer ring 19 which is manufactured without cutting. In FIG. 8, the outer ring 19 is shown as an individual component in an overall view and has the radial flange 19a with the recesses 2f of arcuate configuration. The wheel bearing 20 has two of the inner rings 4, on which in each case one of the raceways 4a is formed.

FIG. 7 shows a wheel flange 21, in which the recesses 5f which are formed as holes 15 lie radially closer to the rotational axis 11 than the holes 5e for accommodating the wheel bolts. Both the holes 15 and the holes 5e are distributed on the circumferential side with the same pitch with respect to the rotational axis 11.

Figure 9:
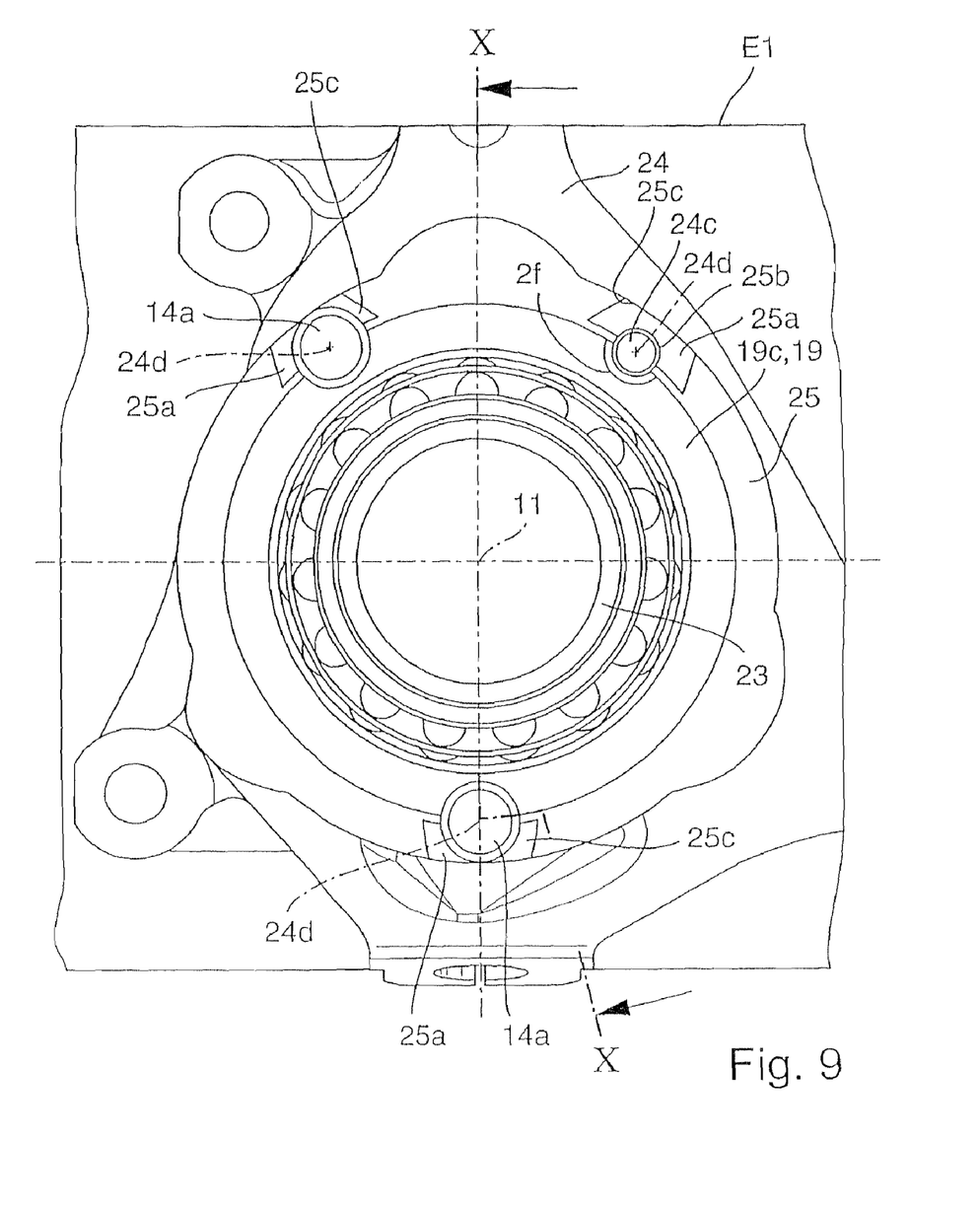
FIG. 9 is a frontal view of a wheel bearing in a wheel carrier without a wheel flange.
Figure 10:
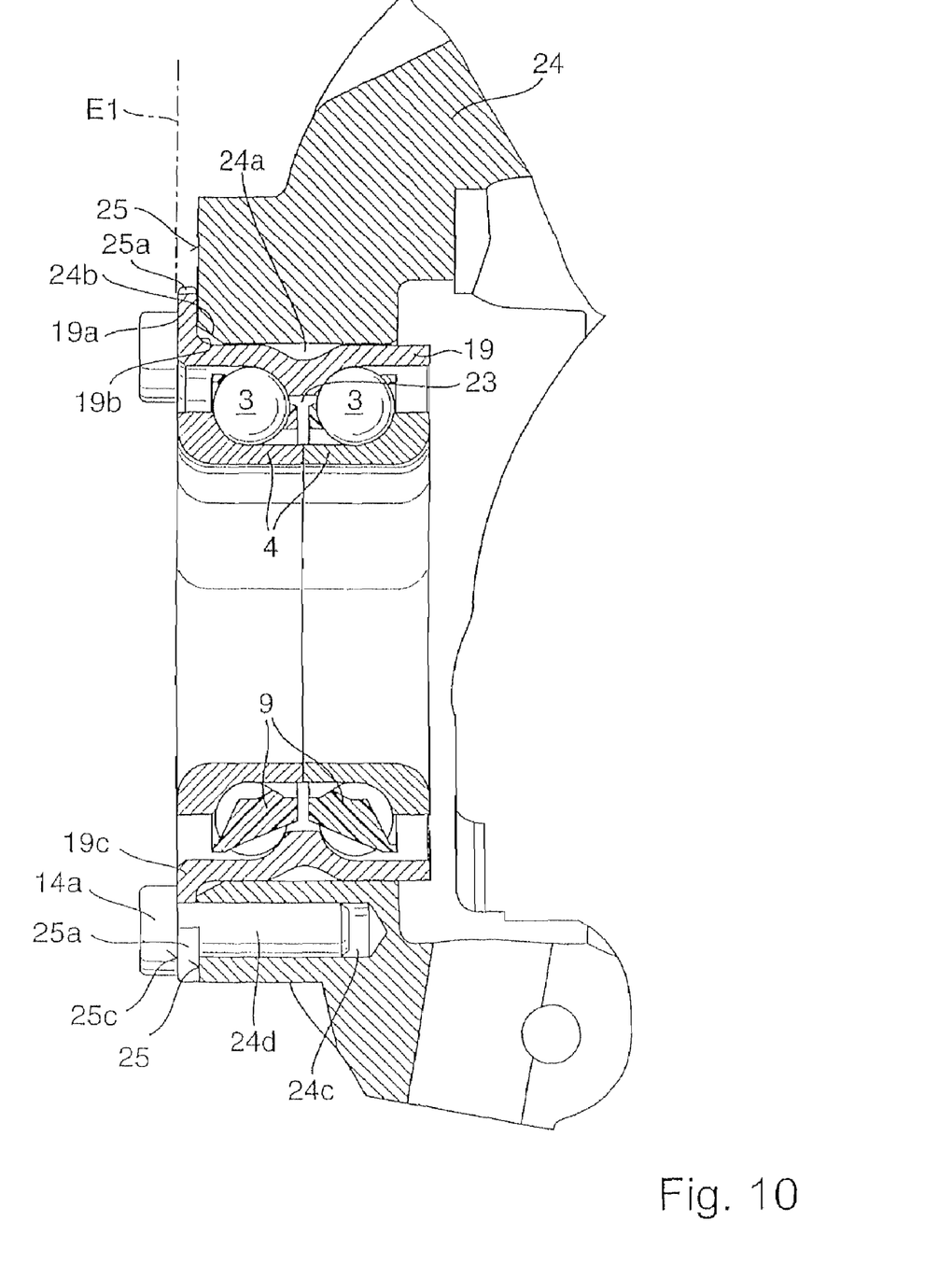
FIG. 10 presents a longitudinal section taken along line X-X from FIG. 9.

FIGS. 9 and 10 show a wheel bearing 23 in a wheel carrier 24. FIG. 9 shows a frontal view of the wheel bearing 23 in the wheel carrier 24 without a wheel flange.

FIG. 10 shows a longitudinal section through the unit along the line X-X from FIG. 9. The wheel bearing 23 has the outer ring 19, the rolling bodies 3, cages 9 and two of the inner rings 4. The outer ring 19 is seated in a radially supported manner in a through hole 24*a* of the wheel carrier. A chamfer 24*b* adjoins the through hole 24*a* on the wheel side of the wheel carrier 24. The chamfer 24*b* is of sufficient dimensions, with the result that a channel 19*b* at the transition from the outer ring 19 to the flange 19*a* is not touched by the wheel carrier 24 (FIG. 10).

The wheel carrier 24 has a planar face 25, against which the flange 19*a* bears axially. Projections 25*a* protrude axially from the planar face. The projections 25*a* adjoin the flange 19*a* radially at those locations where the flange 19*a* has the axial recesses 2*f*. The axial projections 25*a* have axial cutouts 25*b* which are configured arcuately and merge into fastening holes 24*c* in the wheel carrier 24. In each case one fastening element 14 is seated fixedly in one of the fastening holes 24*c* of the wheel carrier and is in each case reached around by in each case one recess 2*f* and the cutout 25*b* of the respective projection 25*a*. Each of the center axes 24*d* of the fastening holes 24*c* extends radially between a recess 2*f* and a cutout 25*b*, in the same direction as the rotational axis 11. The head 14*a* of the fastening element 14 bears axially against axial faces 25*c* and 19*c*. Here, the axial face which is formed on the flange 19*a* and the axial face 25*c* which is formed on the projection 25*a* lie in a common plane E1.

One embodiment of the invention provides for the axial face 25*c* to initially protrude approximately 0.05 mm to 0.2 mm axially beyond the axial face 25*c*, before the fastening elements 14 are introduced into the fastening holes 24*c*. During insertion and fastening of the fastening elements 14 in the fastening holes 24*c*, for example by screwing in, the flange 19*a* is axially deformed elastically or plastically to such an extent that the axial faces 25*c* and 19*c* lie jointly in the plane E1. Permanent axial securing of the outer ring 19 on the wheel carrier 24 is produced.

Figure 11:
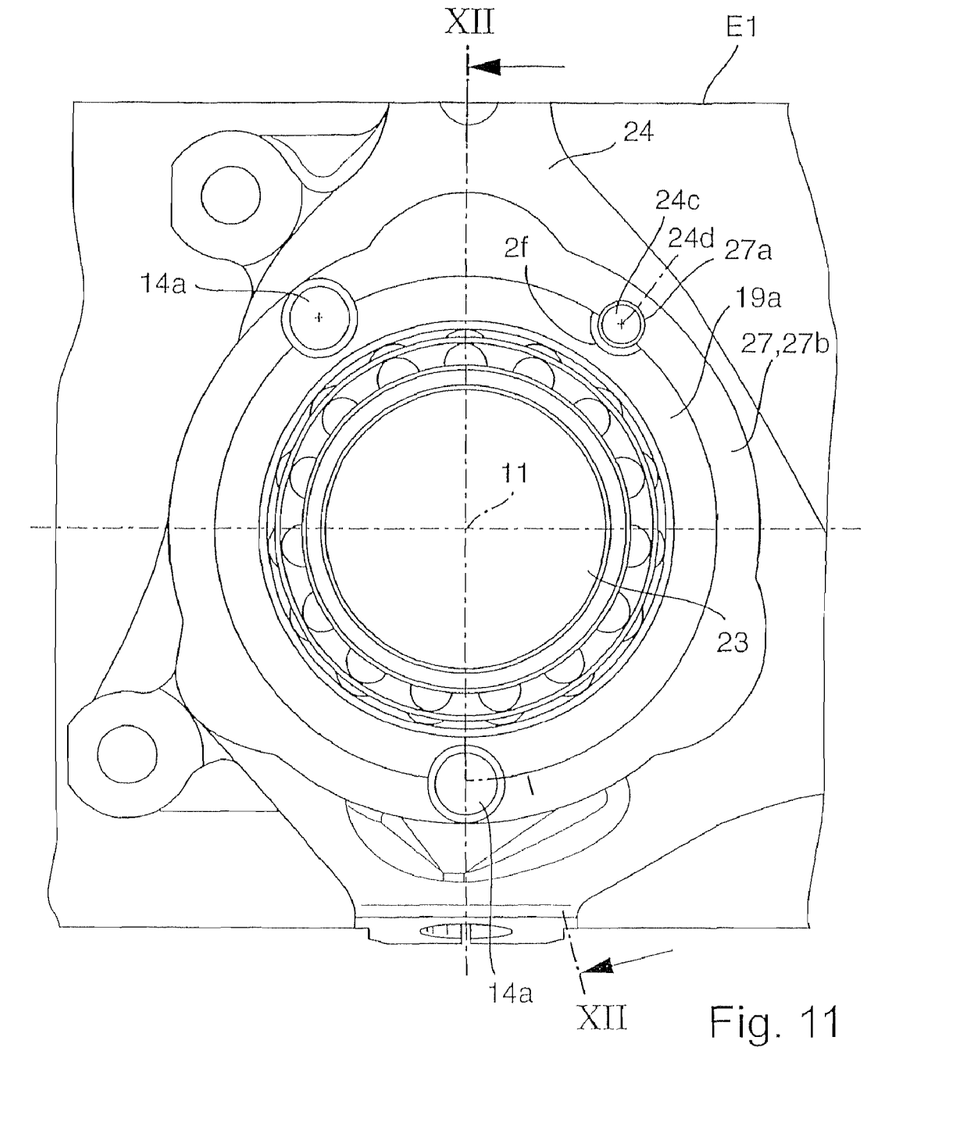
FIG. 11 is a frontal view of an additional embodiment of a wheel bearing.
Figure 12:
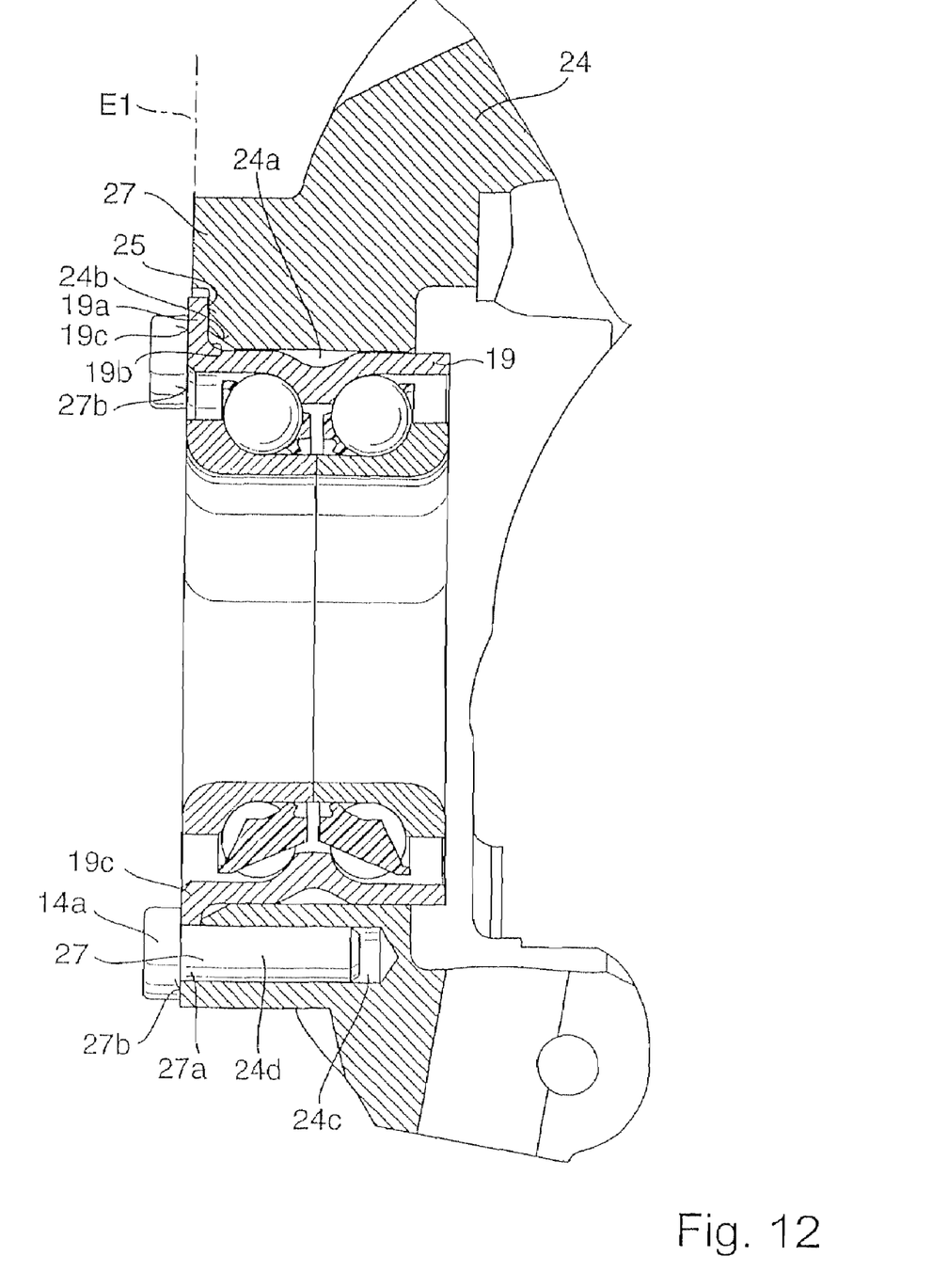
FIG. 12 is a longitudinal section taken along line XII-XII from FIG. 11.

FIGS. 11 and 12 show the wheel bearing 23 in a wheel carrier 24 of alternative design to the illustrations according to FIGS. 9 and 10. FIG. 11 shows a frontal view of the wheel bearing 23 in the wheel carrier 24 without a wheel flange. FIG. 12 shows a longitudinal section through the unit along the line XII-XII from FIG. 11.

The wheel carrier 24 has a planar face 25, against which the flange 19*a* bears axially. An annular section 27 protrudes axially beyond the planar face 25. The annular section 27 reaches around the flange 19*a* and has axial cutouts 27*a* which adjoin the recesses 2*f* radially, are of arcuate design and merge into fastening holes 24*c* in the wheel carrier 24. In each case one fastening element 14 is seated fixedly in one of the fastening holes 24*c* of the wheel carrier and is reached around by in each case one recess 2*f* and the cutout 27*a*. The head 14*a* of each fastening element 14 bears axially against an axial face 27*b* of the annular section 27 and at the same time against the axial face 19*c* of the flange 19*a*. Here, the axial face 19*a* which is formed on the flange 19*a* and the axial face 27*b* lie in the common plane E1.

LIST OF DESIGNATIONS

1 Wheel bearing module
2 Outer ring
2*a* Raceway
2*b* Section
2*c* Flange
2*d* Channel
2*e* Side
2*f* Recess
2*g* Section
2*h* Radial shoulder
2*k* Annular groove
2*l* Transition
2*m* Circumferential surface
2*n* Transition
2*p* Face
2*q* Contour
2*r* Internal geometry
2*s* External geometry
3 Rolling body
4 Inner ring
4*a* Raceway
5 Hub
5*a* Raceway
5*b* Flange rim
5*c* Through hole
5*d* Wheel flange
5*e* Holes
5*f* Recess
5*g* Threads
6 Articulation bell
6*a* Stub
7 Wheel carrier
7*a* Hole
7*b* Fastening hole
8 Wheel bearing
9 Cage
10 Seal
11 Rotational axis
12 Nut
13 Tooth profile
14 Fastening element
14*a* Head
14*b* Shaft
15 Hole
16 Hole
17 Wheel bearing
18 Wheel flange
18*a* Section
18*b* Hole
18*c* Recess
19 Outer ring
19*a* Flange
19*b* Channel
19*c* Axial face
20 Wheel bearing
21 Wheel flange
23 Wheel bearing
24 Wheel carrier
24*a* Through hole
24*b* Chamfer
24*c* Fastening hole
24*d* Center axis
25 Planar face
25*a* Projection
25*b* Cutout
25*c* Axial face
27 Annular section
27*a* Cutout
27*b* Axial face

The invention claimed is:

1. A tubular outer ring of a wheel bearing comprising a radial flange, the flange extending radially outward at the axial end of the outer ring, and the flange having recesses which pass axially through the flange and which are open radially to the outside, for fastening the flange to a wheel carrier, wherein the outer ring is supported radially at least partially in a wheel carrier and the flange is fixed axially to the wheel carrier by fastening elements, the flange being engaged from behind by the fastening elements on a side of the flange which faces axially away from the wheel carrier and is held axially on the wheel carrier.

2. The outer ring of claim 1, wherein the fastening elements are bolts which reach through the recesses.

3. The outer ring of claim 1, wherein the fastening elements are heads of bolts.

4. The outer ring of claim 1, wherein the flange bears axially against the wheel carrier at least in sections.

5. The outer ring of claim 1, wherein the recesses are of arcuate design.

6. The outer ring of claim 1, wherein the outer ring is cold formed.

7. An axial securing means of an outer ring of a wheel bearing on a wheel carrier, wherein the outer ring bears axially against the wheel carrier with a radial flange and the flange is fixed axially to the wheel carrier by fastening elements, the flange being engaged from behind by the fastening elements on a side of the flange which faces axially away from the wheel carrier and is held axially on the wheel carrier and each of the fastening elements at the same time bear axially against the wheel carrier and against the flange.

8. The axial securing means of claim 7, wherein the fastening elements are bolts with heads, each of the bolts being fixed in the wheel carrier and engaging from behind the flange with a head on that side on the flange which faces away from the wheel carrier, and the head bearing at the same time both axially against the flange and against the wheel carrier.

9. The axial securing means of claim 8, wherein each of the heads bears axially against an axial projection of the wheel carrier, the projections adjoining the flange radially.

10. The axial securing means of claim 8, in which the heads bear against a common axial annular section of the carrier, the annular section surrounding the flange circumferentially.

* * * * *